United States Patent
Nguyen (10) Patent No.: US 11,851,070 B1
(45) Date of Patent: Dec. 26, 2023

(54) DRIVER IDENTIFICATION USING GEOSPATIAL INFORMATION

(71) Applicant: Lytx, Inc., San Diego, CA (US)

(72) Inventor: Vincent Nguyen, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 170 days.

(21) Appl. No.: 17/374,776

(22) Filed: Jul. 13, 2021

(51) Int. Cl.
*B60W 40/09* (2012.01)
*G01S 19/42* (2010.01)
*B60W 40/10* (2012.01)
*G06V 40/16* (2022.01)

(52) U.S. Cl.
CPC ........... *B60W 40/09* (2013.01); *B60W 40/10* (2013.01); *G01S 19/42* (2013.01); *G06V 40/16* (2022.01); *B60W 2420/42* (2013.01); *B60W 2420/54* (2013.01); *B60W 2540/221* (2020.02); *B60W 2540/30* (2013.01); *B60W 2556/10* (2020.02)

(58) Field of Classification Search
CPC .. B60W 40/09; B60W 40/10; B60W 2420/42; B60W 2420/54; B60W 2540/221; B60W 2540/30; B60W 2556/10; G01S 19/42; G06V 40/16
See application file for complete search history.

(56) References Cited

U.S. PATENT DOCUMENTS

| | | | |
|---|---|---|---|
| 8,996,234 B1* | 3/2015 | Tamari | B60W 40/09 701/123 |
| 9,925,987 B1* | 3/2018 | Nguyen | G08G 1/0129 |
| 10,262,477 B1* | 4/2019 | Nguyen | G07C 5/008 |
| 11,263,899 B2* | 3/2022 | Ekin | G06V 40/161 |
| 11,529,960 B2* | 12/2022 | Lee | H04L 12/40071 |
| 2006/0052909 A1* | 3/2006 | Cherouny | B60W 30/146 701/1 |
| 2006/0053038 A1* | 3/2006 | Warren | G06Q 40/08 705/4 |
| 2007/0239322 A1* | 10/2007 | McQuade | G07C 5/008 701/1 |
| 2013/0018541 A1* | 1/2013 | Raz | B60W 40/09 701/29.1 |
| 2014/0199662 A1* | 7/2014 | Armitage | G06Q 10/06398 434/65 |
| 2014/0303833 A1* | 10/2014 | Phelan | B60W 40/09 701/31.5 |
| 2017/0076395 A1* | 3/2017 | Sedlik | G07B 15/063 |
| 2018/0201225 A1* | 7/2018 | Farges | H04W 12/08 |
| 2019/0005412 A1* | 1/2019 | Matus | G06Q 30/0201 |
| 2019/0213429 A1* | 7/2019 | Sicconi | G06F 3/012 |
| 2020/0094809 A1* | 3/2020 | Payne | B60W 20/20 |
| 2020/0104617 A1* | 4/2020 | Herbst | G06V 40/20 |
| 2020/0198644 A1* | 6/2020 | Hutchings | B60K 28/02 |
| 2021/0261050 A1* | 8/2021 | Sobhany | B60Q 3/80 |
| 2022/0227231 A1* | 7/2022 | Husain | B60L 3/0046 |
| 2022/0306123 A1* | 9/2022 | Hanson | B60W 50/0098 |
| 2022/0402517 A1* | 12/2022 | Sicconi | B60W 50/14 |

* cited by examiner

*Primary Examiner* — Babar Sarwar
(74) *Attorney, Agent, or Firm* — Van Pelt, Yi & James LLP (57) ABSTRACT

The system comprises an interface and a processor. The interface is configured to receive vehicle data, comprising data associated with a vehicle over a period of time; and receive driver location data, comprising location data associated with one or more drivers of a roster of drivers. The processor is configured to determine a likely pool of drivers based at least in part on the driver location data and the vehicle data; and process the vehicle data and the likely pool of drivers using a model to determine a most likely driver.

18 Claims, 9 Drawing Sheets

DRIVER IDENTIFICATION USING GEOSPATIAL INFORMATION

BACKGROUND OF THE INVENTION

Modern vehicles (e.g., airplanes, boats, trains, cars, trucks, etc.) can include a vehicle event recorder in order to better understand the timeline of an anomalous event (e.g., an accident). A vehicle event recorder mounted on a vehicle typically includes a set of sensors—for example, video recorders, audio recorders, accelerometers, gyroscopes, vehicle state sensors, global positioning system (GPS), etc., that report data, which is used to determine the occurrence of an anomalous event (e.g., a sudden stop, a hard maneuver, a collision, etc.). A vehicle event recorder with modern hardware is typically able to record a driver image and perform facial recognition to determine which driver of a roster of drivers is recorded in the driver image. Facial recognition can be used to determine a driver associated with a route (e.g., a leg of travel associated with a GPS trail). However, it is common within a route to cross between different jurisdictions including different regulations around facial recognition technology. This creates a problem wherein the facial recognition technology must not be used on image data captured within a region that prohibits it; however it is still desired to determine which driver of the roster of drivers is associated with each route.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system comprises an interface configured to receive vehicle data, comprising data associated with a vehicle over a period of time, and receive driver location data, comprising location data associated with one or more drivers of a roster of drivers, and a processor configured to determine a likely pool of drivers based at least in part on the driver location data and the vehicle data, and process the vehicle data and the likely pool of drivers using a model to determine a most likely driver.

A system for driver identification utilizes a set of vehicle data to determine the driver identification. The set of vehicle data includes face data only when configured to be acquired by the client as a function of the vehicle location data (e.g., a GPS point or a GPS path), vehicle sensor data, dynamic maneuver data (e.g., turning data, acceleration data, stopping data, or lane change data), static behavior data (e.g., following distance data, lane position data, or parking distance data), vehicle sensor data (e.g., accelerometer data, gyroscope data, microphone data, camera data, engine data, brake data, or vehicle electrical system data) and historical data (e.g., a historical driver schedule or a historical driver route). The system for driver identification begins with a driver roster. Performing a driver identification comprises selecting a driver from the driver roster. A first step in the driver identification process comprises determining a likely pool of drivers of the driver roster. The likely pool of drivers is determined by determining a vehicle region based on the vehicle data, and determining for each driver of the driver roster whether the driver is associated with a known location, and if the driver is associated with a known location, if the known location is within the vehicle region. In the event that the driver is associated with a known location that is not within the vehicle region, the driver is removed from the likely pool of drivers. After the location of each driver is considered, and the driver removed from the likely pool of drivers in the event the driver location prevents them from being the driver of the vehicle (e.g., a driver face data is excluded in response to having two similar faces from completely different locations where one is excluded as it does not match with a recent location data for the face), the remaining likely pool of drivers comprises only drivers with a possibility of being the driver of the vehicle. The system for driver identification then determines the most likely driver of the likely pool of drivers based on the vehicle data. For example, a machine learning model receives the likely pool of drivers and the vehicle data and makes a determination of the most likely driver of the likely pool of drivers. Prior to inputting the vehicle data to the machine learning model, face data of the vehicle data is filtered. For example, all face data of the vehicle data is removed, low quality face data is removed, or all face data is allowed. Use of limited face data in conjunction with other data allows an accurate determination of the most likely driver. The system for driver identification improves the computer by performing an automatic determination of a driver identity without using facial recognition technology in regions where it is not allowed or requiring additional identification mechanisms.

In some embodiments, the system for driver identification additionally comprises a consent management system and/or a biometric data retention system. A consent management system comprises a system for providing a driver with a facial recognition consent agreement document, receiving a facial recognition consent, and storing the facial recognition consent associated with the driver. Storing the facial recognition consent associated with the driver comprises storing the facial recognition consent associated with driver biometric data, storing the facial recognition consent associated with driver identification data, storing the facial recognition consent in a driver data storage location (e.g., a computer filesystem directory associated with the driver), etc. In some embodiments, a client configures the system as to where facial data is to be required based at least in part on location. A biometric data retention system enforces a biometric data retention policy. A biometric data retention policy comprises a policy designed to satisfy biometric data retention requirements for all appropriate jurisdictions. For example, a biometric data retention policy comprises a policy to delete all biometric data associated with a person if the data has not been used for one year. Enforcing this biometric data retention policy comprises storing all biometric data associated with a driver (e.g., by associating the biometric data with a driver identifier) and additionally storing a date of last access to biometric data associated with a driver. For example, the date of last access to biometric data associated with a driver is stored in a centralized database for enabling the data of last access to biometric data for each driver in the system. Each time the biometric data for a driver is used the date of last access is updated in the centralized database. Each day, the centralized database is checked, and for any driver where the date of last access is more than one year past, all biometric data associated with the driver is accessed and deleted.

In some embodiments, the system improves the computer by improving identification of drivers—for example, computed matches are improved and made more accurate by removing a set of drivers from the pool of eligible matches.

Figure 1:
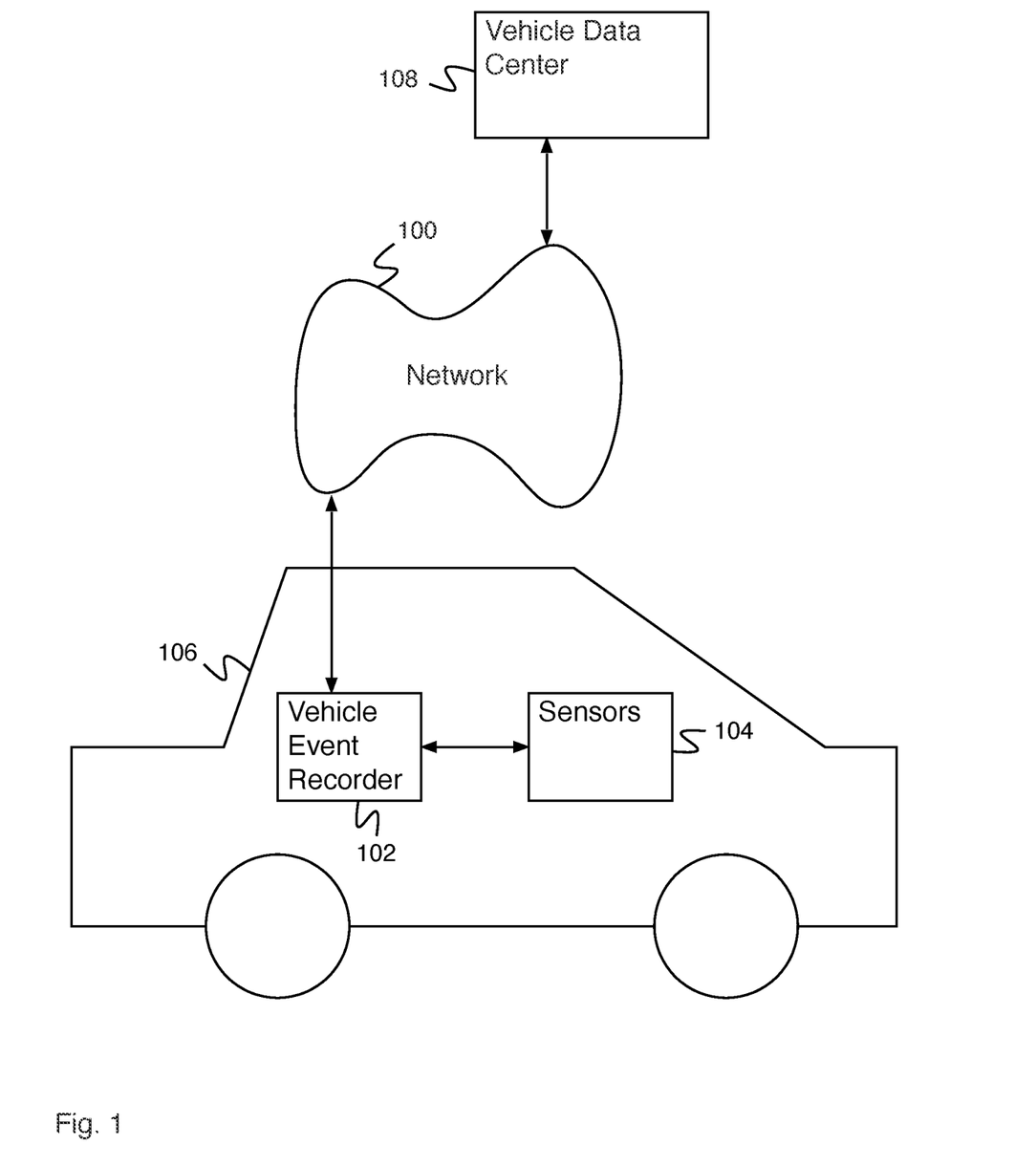
FIG. 1 is a block diagram illustrating an embodiment of a system including a vehicle event recorder.

FIG. 1 is a block diagram illustrating an embodiment of a system including a vehicle event recorder. Vehicle event recorder 102 comprises a vehicle event recorder mounted in a vehicle (e.g., a car or truck). Vehicle event recorder 102 is in communication with vehicle sensors 104. Vehicle sensors 104 comprises a set of sensors—for example, one or more video recorders (e.g., one or more forward facing video recorders, one or more side facing video recorders, one or more rear facing video recorders, one or more interior video recorders, etc.), audio recorders (e.g., one or more exterior audio recorders, one or more interior audio recorders, etc.), accelerometers, gyroscopes, vehicle state sensors, proximity sensors (e.g., a front distance sensor, a side distance sensor, a rear distance sensor, etc.), advanced driver assistance system (ADAS) sensors, a GPS, outdoor temperature sensors, moisture sensors, line tracker sensors (e.g., laser line tracker sensors), a lane change sensor, etc. Vehicle state sensors comprise internal vehicle state sensors, for example a speedometer, an accelerator pedal sensor, a brake pedal sensor, an engine revolutions per minute (RPM) sensor, an engine temperature sensor, a headlight sensor, an airbag deployment sensor, driver and passenger seat weight sensors, an anti-locking brake sensor, traction control system sensors, drive wheel speed sensors, shocks sensors, an engine exhaust sensor, a gear position sensor, a cabin equipment operation sensor, an engine control unit (ECU) sensor, etc. Vehicle event recorder 102 comprises a system for receiving and processing sensor data. Processing sensor data comprises filtering data, identifying patterns in data, detecting events, etc. Vehicle event recorder 102 is mounted on vehicle 106 in any appropriate location—for example, the chassis, the front grill, the dashboard, the rear-view mirror, the rear window or wall, the floor, etc. There are times when vehicle event recorder 102 comprises multiple units mounted in different locations within vehicle 106 instead of a single unit, particularly when there are space constraints for a given location (e.g., behind the rear view mirror) and more space is required to house electronic components.

Vehicle event recorder 102 comprises a communications system for communicating with network 100. Network 100 comprises a network for communications. Network 100 comprises one or more of a wireless network, a wired network, a cellular network, a Code Division Multiple Access (CDMA) network, a Global System for Mobile Communication (GSM) network, a Long-Term Evolution (LTE) network, a Universal Mobile Telecommunications System (UMTS) network, a Worldwide Interoperability for Microwave Access (WiMAX) network, a Dedicated Short-Range Communications (DSRC) network, a Message Queueing for Telemetry Transport (MQTT) network, a local area network, a wide area network, the Internet, etc. There are instances when network 100 comprises multiple networks, for instance, multiple interconnected networks spanning different regions, networks operating at different times, overlaid networks with different access permissions, networks with different bandwidth, etc. Different networks comprising network 100 typically comprise different bandwidth cost (e.g., a wired network has a very low cost, a wireless Ethernet connection has a moderate cost, and a cellular data network has a high cost). In some embodiments, network 100 has a different cost at different times (e.g., a higher cost during the day and a lower cost at night).

Vehicle event recorder 102 communicates with vehicle data center 108 via network 100. Vehicle data center 108 comprises a remote server for data storage, data analysis, data access by a coach and/or manager, data review by a human reviewer, etc. For example, vehicle data center 108 comprises a system for identification, comprising an interface configured to receive vehicle data comprising data associated with a vehicle over a period of time and receive driver location data comprising location data associated with one or more drivers of a roster of drivers, and a processor configured to determine a likely pool of drivers based at least in part on the driver location data and the vehicle data, and process the vehicle data and the likely pool of drivers using a model to determine a most likely driver.

Figure 2:
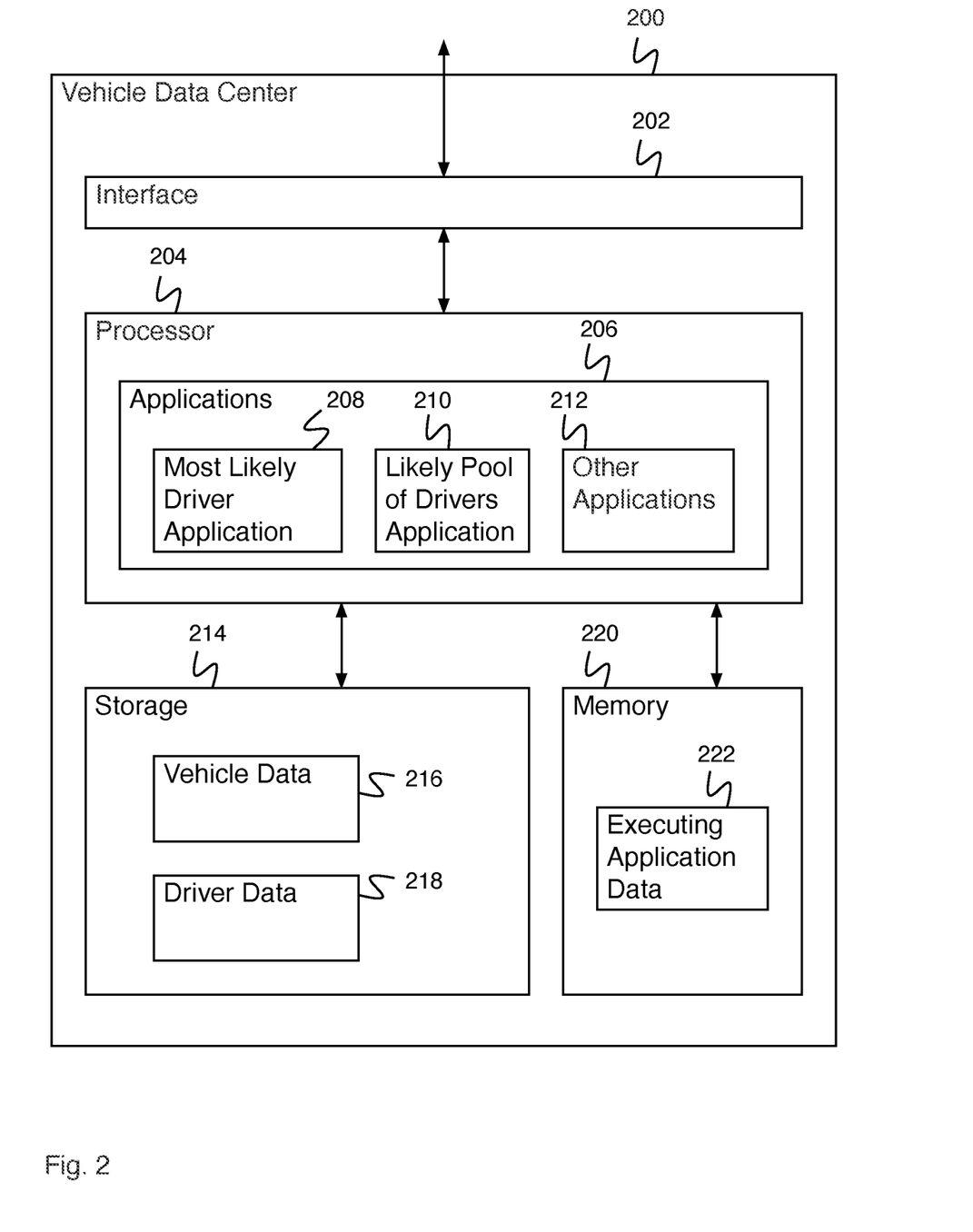
FIG. 2 is a block diagram illustrating an embodiment of a vehicle data center.

FIG. 2 is a block diagram illustrating an embodiment of a vehicle data center. In some embodiments, vehicle data center 200 comprises vehicle data center 108 of FIG. 1. In various embodiments, vehicle data center 200 comprises a computer, a networked set of computers, a cloud computing system, or any other appropriate vehicle data center system.

In the example shown, vehicle data center 200 comprises interface 202. For example, interface 202 comprises an interface for receiving sensor data, receiving a request to identify sensor data associated with a target, receiving network communications, receiving a detector, receiving vehicle data comprising data associated with a vehicle over a period of time, receiving driver location data comprising location data associated with one or more drivers of a roster of drivers, providing an indication of an anomalous event, providing sensor data, providing communications, providing an indication sensor data associated with a target was identified, etc. Processor 204 comprises a processor for executing applications 206. Applications 206 comprise most likely driver application 208, likely pool of drivers application 210, and other applications 212. Most likely driver application 208 comprises an application for determining a most likely driver based at least in part on vehicle data and a likely pool of drivers. For example, most likely driver application 208 determines a most likely driver using a model (e.g., a model chosen from a set of one or more models). Likely pool of drivers application 210 comprises an application for determining a likely pool of drivers based at least in part on vehicle data (e.g., for determining a vehicle location boundary) and driver data (e.g., indicating a location associated with some drivers of a roster of drivers). Other applications 212 comprise any other appropriate applications (e.g., a communications application, a data storage and retrieval application, a web browser application, a user interface application, a data analysis application, etc.). For example, applications 206 is configured to determine a likely pool of drivers based at least in part on the driver location data and the vehicle data, and process the vehicle data and the likely pool of drivers using a model to determine a most likely driver. Storage 214 comprises vehicle data 216 (e.g., vehicle data recorded by one or more sensors—for example, video data, audio data, GPS data, accelerometer data, face data, etc.) and driver data 218 (e.g., driver data indicating the location of drivers of a roster of drivers). Memory 220 comprises executing application data 222 comprising data associated with applications 206.

Figure 3:
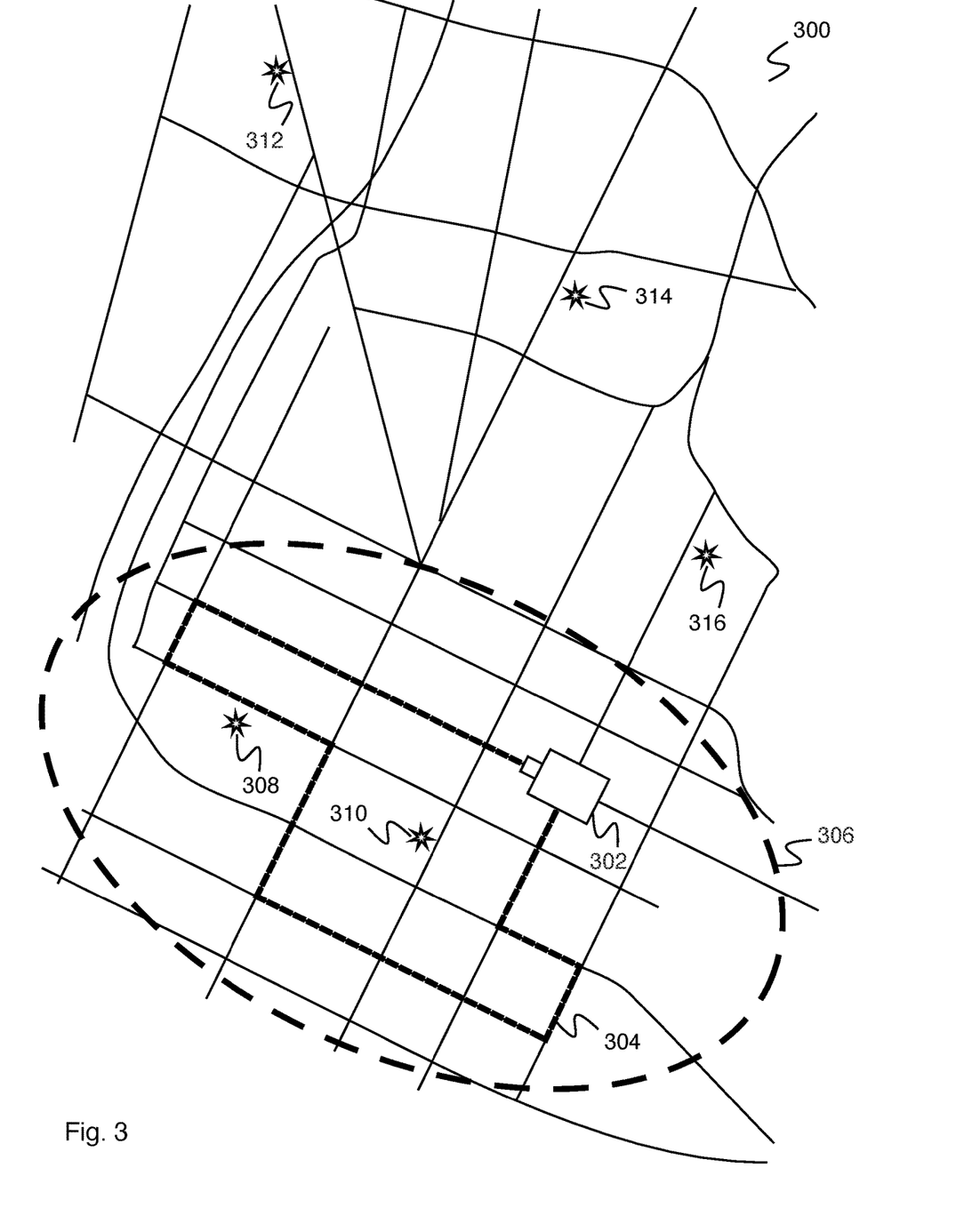
FIG. 3 is a diagram illustrating an embodiment of a map.

FIG. 3 is a diagram illustrating an embodiment of a map. In the example shown, map 300 comprises a map indicating a vehicle route and likely driver boundary. Vehicle 302 comprises a vehicle driving on a route. In some embodiments, vehicle 302 comprises vehicle 106 of FIG. 1. Vehicle 302 is recorded (e.g., by a GPS system of a vehicle event recorder) to have driven route 304. Likely driver boundary 306 comprises a likely driver boundary within which a driver is considered to be a likely driver of vehicle 302. Driver 308 and driver 310 are within likely driver boundary 306 and are considered to be likely drivers of vehicle 302. Driver 312, driver 314, and driver 316 are not within likely driver boundary 306 and are not considered to be likely drivers of vehicle 302. For example, a most likely driver determination process to determine a most likely driver of vehicle 302 will consider driver 308 and driver 310 but not driver 312, driver 314, or driver 316.

In some embodiments, the driver location is determined by a vehicle location. In some embodiments, the system considers that a driver cannot be in two locations within a short period of time. In some embodiments, a location of an image is used to decide as to whether the image is run through facial recognition. In some embodiments, a driver and the associated vehicle has a GPS location trail. In some embodiments, in response to two GPS location trails not overlapping in space during similar periods of driving, then the associated drivers can be excluded from the roster of possible drivers.

Figure 4:
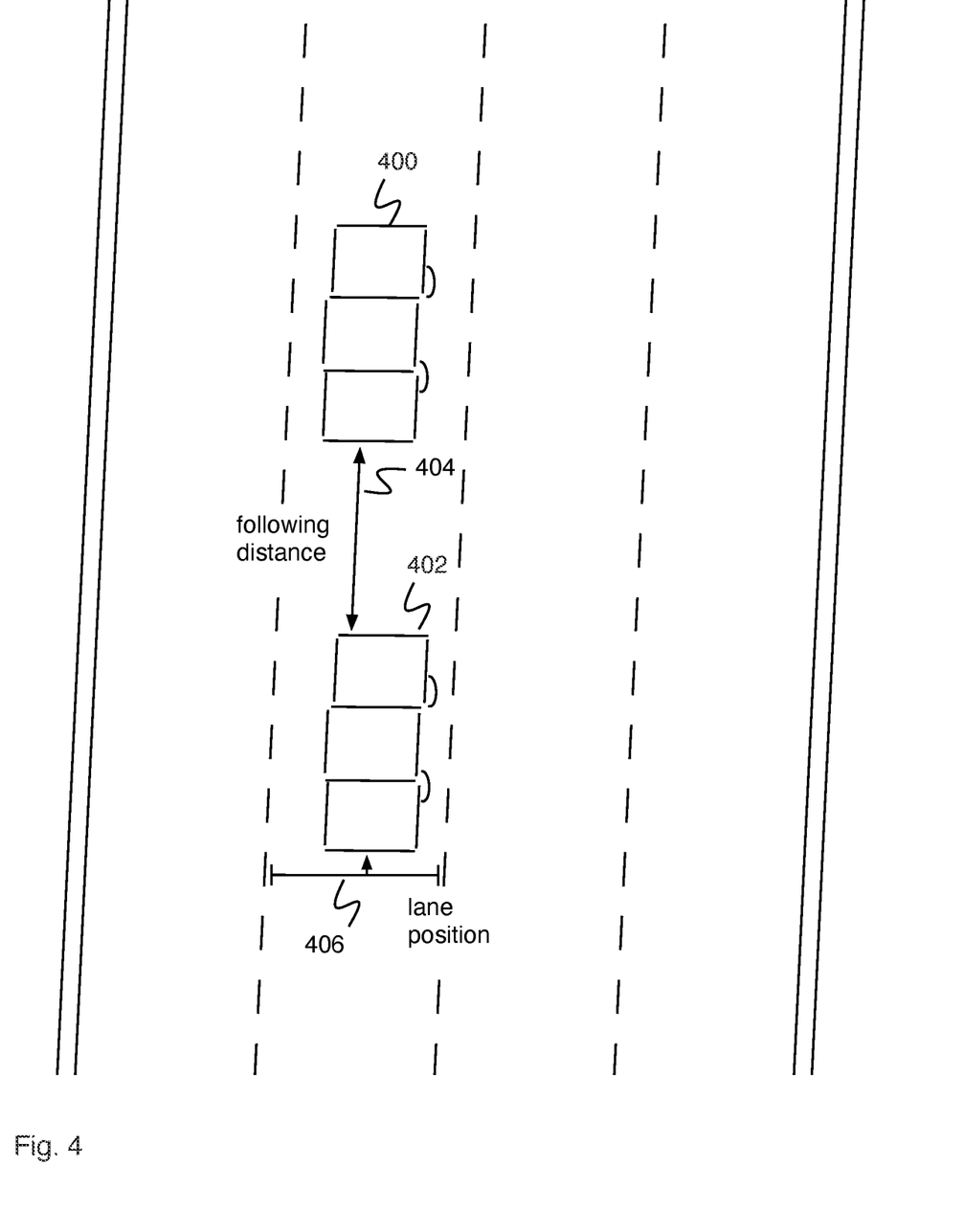
FIG. 4 is a diagram illustrating an embodiment of static behaviors.

FIG. 4 is a diagram illustrating an embodiment of static behaviors. In some embodiments, data describing static behaviors comprises vehicle data (e.g., vehicle data 216 of FIG. 2) describing a vehicle. In the example shown, vehicle 402 drives following vehicle 400. Following distance 404 comprises the distance between the front of vehicle 402 and the rear of vehicle 400. A driver typically drives with a preferred following distance (e.g., dependent on speed, weather, traffic density, etc.). Lane position 406 comprises the left-right position within the lane of the left-right center of vehicle 402. A driver typically drives with a preferred following distance. Static behavior data describing other behaviors can additionally be captured—for example, parking position data, preferred driving speed data, and intersection stopping position data.

Figure 5:
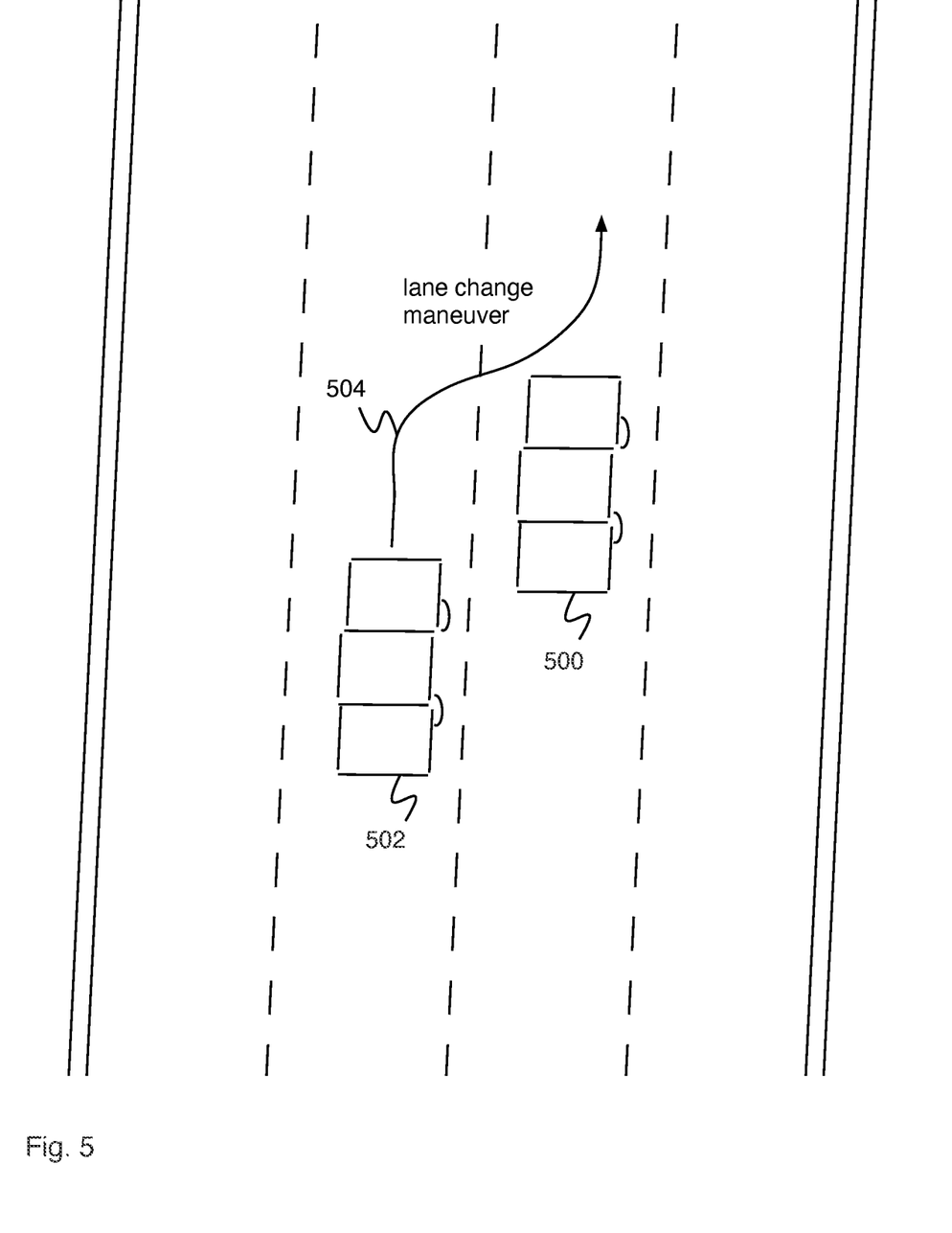
FIG. 5 is a diagram illustrating an embodiment of a dynamic behavior.

FIG. 5 is a diagram illustrating an embodiment of a dynamic behavior. In the example shown, FIG. 5 illustrates dynamic behavior comprising a lane change maneuver. In the example shown, vehicle 502 approaches vehicle 500 from behind, positioned one lane to the left. Vehicle 502 passes vehicle 500 on its left, then changes lane in front of vehicle 500. Lane change maneuver 504 indicates the dynamic behavior of vehicle 502. One or more measurements of lane change maneuver 504 are determined, including, for example, lane change rate, minimum distance between vehicles, ultimate distance between vehicles when maneuver complete, acceleration prior to lane change, etc. Dynamic behavior data describing other maneuvers can additionally be captured, for example, turning data, acceleration data, and stopping data. A driver exhibits preferred maneuver characteristics that can be determined from an example set of maneuvers.

Figure 6:
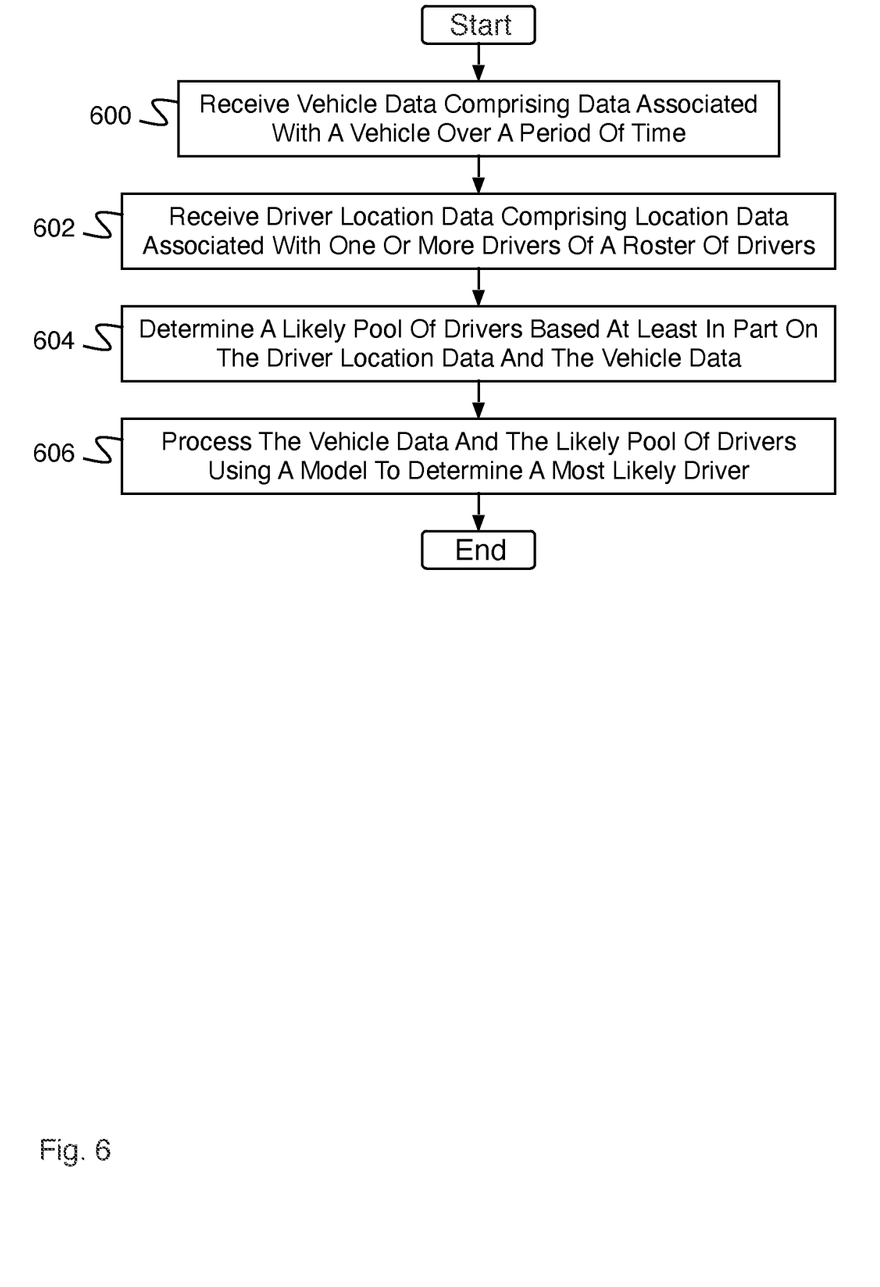
FIG. 6 is a flow diagram illustrating an embodiment of a process for driver determination.

FIG. 6 is a flow diagram illustrating an embodiment of a process for driver determination. In some embodiments, the process of FIG. 6 is executed by a vehicle data center (e.g., vehicle data center 108 of FIG. 1). For example, the process for determination of a most likely driver comprises an offline process (e.g., a process executed not in real time—for example, overnight, once a week, etc.). In the example shown, in 600, vehicle data comprising data associated with a vehicle over a period of time is received. For example, vehicle data is received from a vehicle event recorder mounted on a vehicle. In 602, driver location data comprising location data associated with one or more drivers of a roster of drivers is received. Driver location data is received from a vehicle event recorder, from storage within the vehicle data center, or from another appropriate location. For example, driver location data comprises most recently determined location data associated with the one or more drivers of the roster of drivers and/or historical location data associated with the one or more drivers of the roster of drivers. In 604, a likely pool of drivers is determined based at least in part on the driver location data and the vehicle data. For example, determining the likely pool of drivers comprises removing from the roster of driver those drivers known to be in locations preventing them from being the driver of the vehicle. In 606, the vehicle data and the likely pool of drivers are processed using a model to determine a most likely driver. For example, the most likely driver comprises the driver of the likely pool of drivers that is most likely associated with the vehicle data. In some embodiments, the determination of a most likely driver is additionally based at least in part on historical traffic data (e.g., historical traffic data determined from traffic records, from a historical traffic data server, etc.).

Figure 7:
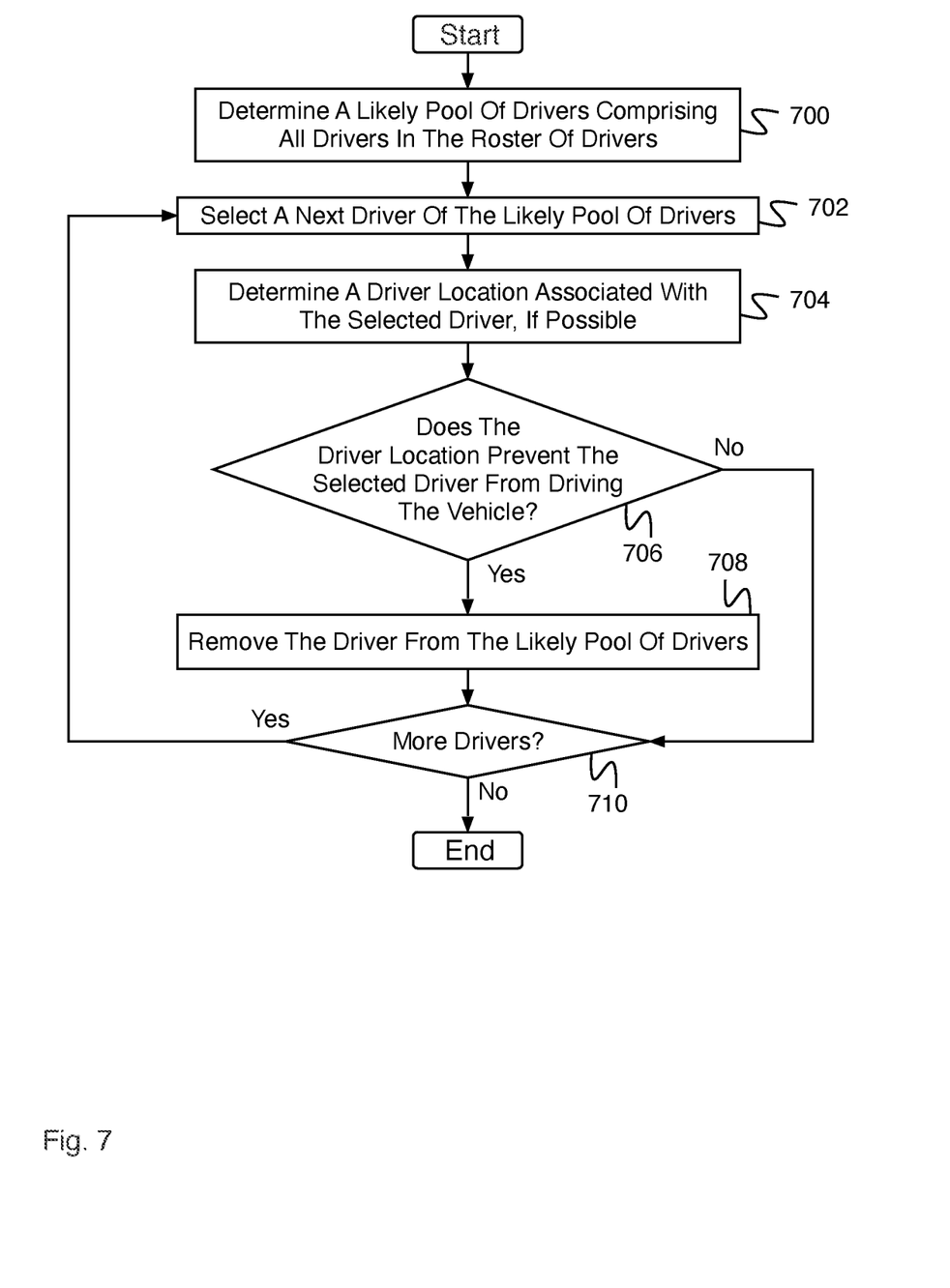
FIG. 7 is a flow diagram illustrating an embodiment of a process for determining a likely pool of drivers.

FIG. 7 is a flow diagram illustrating an embodiment of a process for determining a likely pool of drivers. In some embodiments, the process of FIG. 7 implements 604 of FIG. 6. In the example shown, in 700, a likely pool of drivers comprising all drivers in the roster of drivers is determined. In 702, a next driver of the likely pool of drivers is selected. In some embodiments, the next driver of the likely pool of drivers comprises the first driver in the likely pool of drivers. In 704, a driver location associated with the selected driver is determined, if possible. In some embodiments, a geotag associated with a picture or image is checked before running the picture or image through a facial recognition model. In 706, it is determined whether the driver location prevents the selected driver from driving the vehicle (e.g., whether the driver location is known to be outside a likely driver boundary). In some embodiments, a driver location does not prevent the driver from driving the vehicle, but driver location would dictate whether the picture is to be used from that location to run through facial recognition or not based on the client preferences. In some embodiments, a certain driver is associated with a location and so that certain driver can be eliminated from a candidate list of potential identities for the driver. In various embodiments, the driver location is confirmed to be outside a likely driver boundary, is probabilistically determined to be outside a likely driver boundary, is determined using facial recognition, driver signature, manager or other worker input and/or verification, or any other appropriate manner of determining to be outside a likely driver boundary. In the event it is determined that the driver location does not prevent the selected driver from driving the vehicle, control passes to 710. In some embodiments, in the event that the driver location is not known, it is determined that the driver location does not prevent the selected driver from driving the vehicle, and control additionally passes to 710. In the event it is determined that the driver location prevents the selected driver from driving the vehicle, control passes to 708. In some embodiments, in the event that a driver location associated with the selected driver cannot be determined, other characteristics are utilized to determine whether the driver cannot be driving the selected vehicle. For example, dynamic maneuver data and static behavior data associated with the selected driver are compared with dynamic maneuver data and static behavior data associated with the selected vehicle to determine whether the selected driver cannot be driving the selected vehicle. In the event it is determined that the selected driver cannot be driving the selected vehicle, control passes to 708. In the event it is not determined that the selected driver cannot be driving the selected vehicle, control passes to 710. In 708, the driver is removed from the likely pool of drivers. In 710, it is determined whether there are more drivers (e.g., more drivers of the likely pool of drivers not yet considered for removal). In the event it is determined that there are more drivers, control passes to 702. In the event it is determined that there are not more drivers, the process ends.

Figure 8:
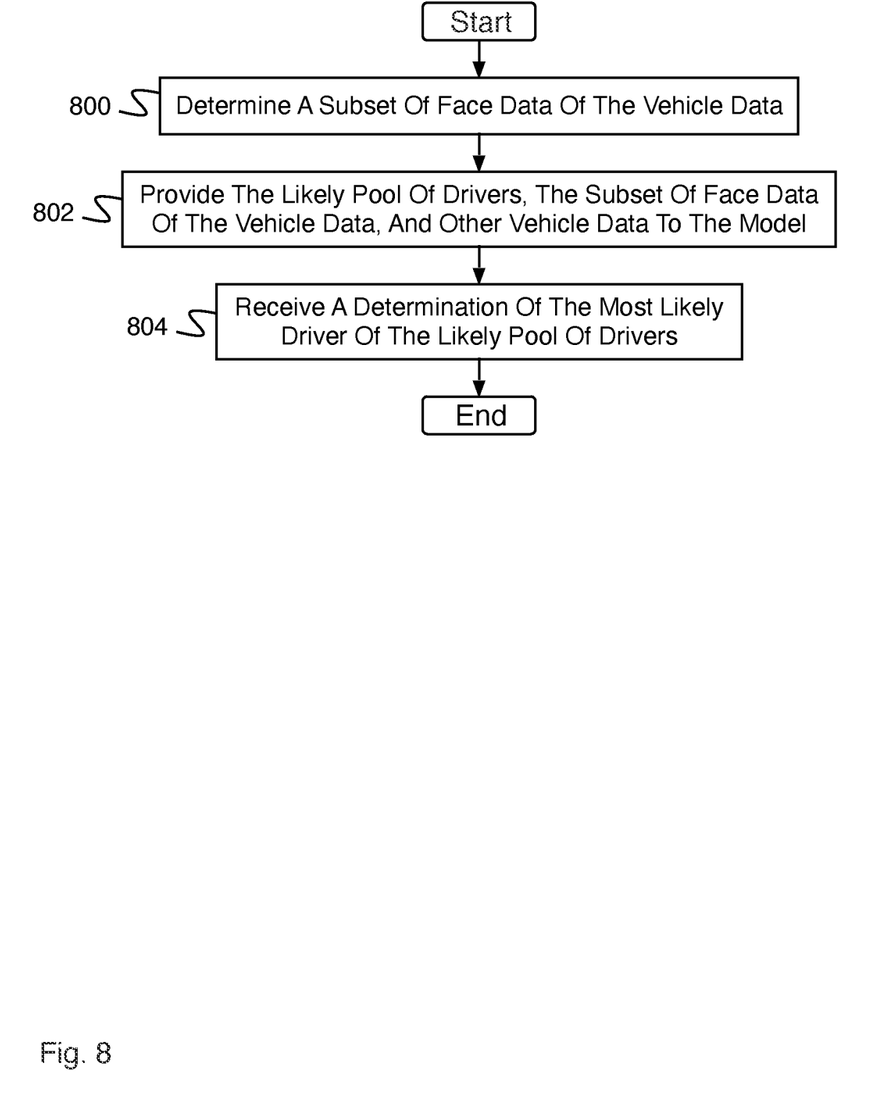
FIG. 8 is a flow diagram illustrating an embodiment of a process for processing vehicle data and a likely pool of drivers using a model to determine a most likely driver.

FIG. 8 is a flow diagram illustrating an embodiment of a process for processing vehicle data and a likely pool of drivers using a model to determine a most likely driver. In some embodiments, the process of FIG. 8 is used to implement 606 of FIG. 6. In 800, a subset of face data of the vehicle data is determined. For example, the subset of face data comprises all face data, no face data, or only face data captured in regions where performing facial recognition is allowed. In various embodiments, face data comprises one or more of the following: face image data, facial recognition system data, face parameter data, face image data capture immediately prior to a time or area with face data, face image data captured immediately after the time or area without face data, and/or any other appropriate data. Determination of face data captured in regions where performing facial recognition is allowed is performed by determining the subset of face data based at least in part on a set of regulation data associated with a set of locations or based at least in part on a client defined geofence (e.g., a client indication of regions where performing facial recognition is allowed). In 802, the likely pool of drivers, the subset of face data of the vehicle data, and other vehicle data (e.g., other non-face data vehicle data) are provided to the model. In some embodiments, a plurality of models are available, and a model is selected from the plurality of models based at least in part on the subset of face data chosen (e.g., a first model is used when all face data is used, a second model is used when no face data is used, and a third model is used when only face data captured in regions where performing facial recognition is allowed is used). For example, in addition to using face data, not using face data, or using only face data captured in regions where performing facial recognition is allowed, the model determines the most likely driver based at least in part on vehicle sensor data, dynamic maneuver data, static behavior data, vehicle sensor data, and/or historical data. In 804, a determination of the most likely driver of the likely pool of drivers is received (e.g., from the model).

Figure 9:
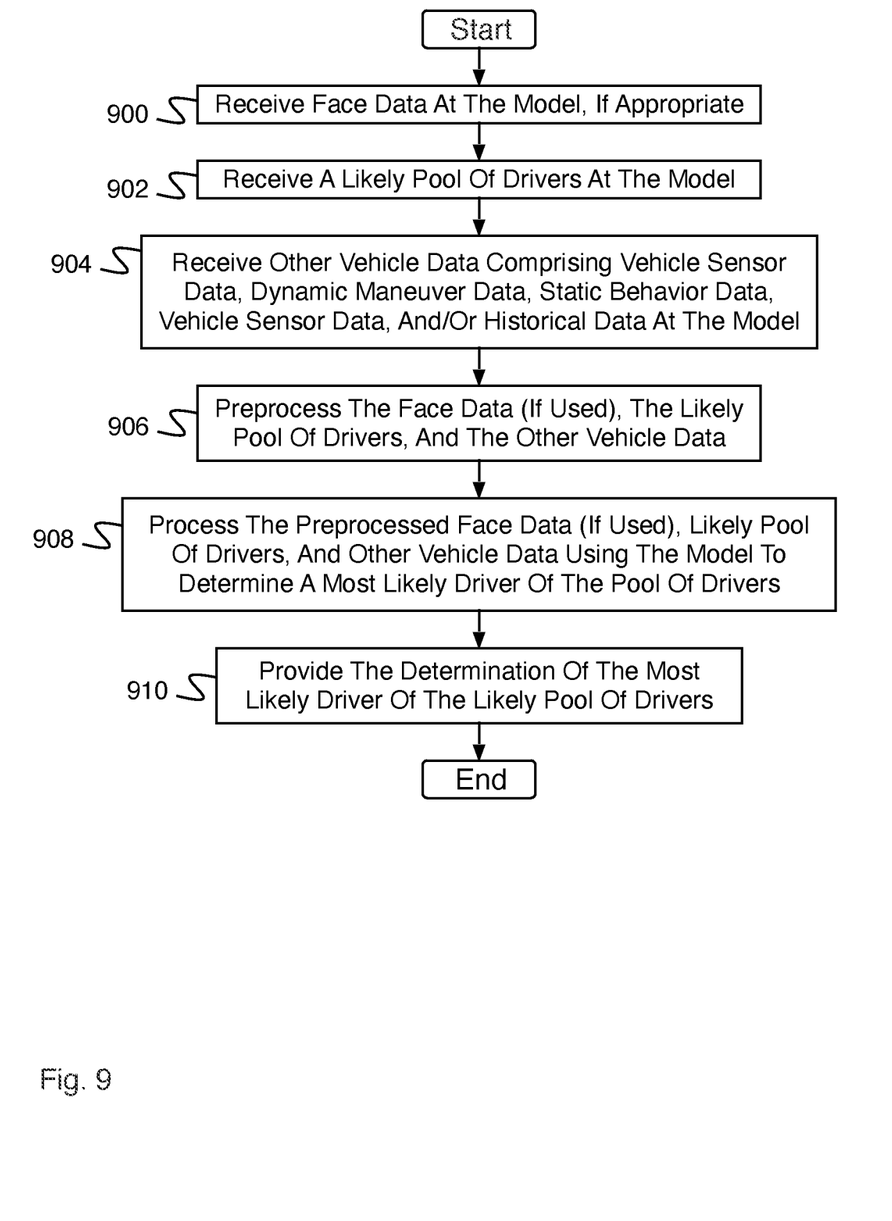
FIG. 9 is a flow diagram illustrating an embodiment of a process for determining a most likely driver of a likely pool of drivers using a model

FIG. 9 is a flow diagram illustrating an embodiment of a process for determining a most likely driver of a likely pool of drivers using a model. In some embodiments, the process of FIG. 9 is executed by a model serving process of a vehicle data server. In some embodiments, the process of FIG. 9 is used to implement 606 of FIG. 6. In the example shown, in 900, face data is received at the model, if appropriate (e.g., if the model comprises a model using all face data or face data captured in regions where performing facial recognition is allowed). In 902, a likely pool of drivers is received at the model. In 904, other vehicle data comprising vehicle sensor data, dynamic maneuver data, static behavior data, vehicle sensor data, and/or historical data is received at the model. In 906, the face data (if used), the likely pool of drivers, and the other vehicle data are preprocessed. For example, preprocessing data comprises performing computations on data, summarizing data (e.g., determining data statistics), rounding data, cleaning data, etc. In 908, the preprocessed face data (if used), likely pool of drivers, and other vehicle data are processed using the model to determine a most likely driver of the pool of drivers. For example, processing data using the model comprises executing a machine learning algorithm, a neural network algorithm, an artificial intelligence algorithm, etc. In 910, the determination of the most likely driver of the likely pool of drivers is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
an interface configured to:
receive vehicle data, comprising data associated with a vehicle over a period of time; and receive driver location data, comprising location data associated with one or more drivers of a roster of drivers; and a processor configured to:

determine a likely pool of drivers based at least in part on the driver location data and the vehicle data; and process the vehicle data and the likely pool of drivers using a model to determine a most likely driver associated with an occurrence of an anomalous event on a route, comprising to:

determine a subset of face data of the vehicle data based on a set of regulation data associated with the driver location data;

select the model based on the subset of face data including all face data, the subset of face data including no face data, or the subset of face data including face data captured in regions where performing facial recognition is allowed, wherein the model comprises executing a machine learning algorithm, a neural network algorithm, an artificial intelligence algorithm, or any combination thereof; and receive the most likely driver from the model based on the subset of face data and the likely pool of drivers.

2. The system of claim 1, wherein the vehicle data comprises vehicle location data, dynamic maneuver data, static behavior, data, the face data, vehicle sensor data, and/or historical data.

3. The system of claim 2, wherein the vehicle location data comprises a GPS point or a GPS path.

4. The system of claim 2, wherein the dynamic maneuver data comprises turning data, acceleration data, stopping data, and/or lane change data.

5. The system of claim 2, wherein the static behavior data comprises following distance data, lane position data, and/or parking position data.

6. The system of claim 2, wherein the face data comprises face image data, facial recognition system data, face parameter data, face image data capture immediately prior to a time or area with face data, and/or face image data captured immediately after the time or area without face data.

7. The system of claim 2, wherein the vehicle sensor data comprises accelerometer data, gyroscope data, microphone data, camera data, engine data, brake data, and/or vehicle electrical system data.

8. The system of claim 2, wherein the historical data comprises a historical driver schedule and/or a historical driver route.

9. The system of claim 1, wherein the driver location data comprises most recently determined location data associated with the one or more drivers of the roster of drivers and/or historical location data associated with the one or more drivers of the roster of drivers.

10. The system of claim 1, wherein determining the likely pool of drivers comprises removing from the roster of driver those drivers known to be in locations preventing them from being a driver of the vehicle.

11. The system of claim 1, wherein the model utilizes face data of the vehicle data and other data of the vehicle data.

12. The system of claim 1, wherein the processor is further configured to determine the subset of face data based at least in part on a set of regulation data associated with a set of locations.

13. The system of claim 1, wherein the processor is further configured to determine the subset of face data based at least in part on a client defined geofence.

14. The system of claim 1, wherein the model determines that the most likely driver comprises a driver of the likely pool of drivers that is most likely associated with the vehicle data.

15. The system of claim 1, wherein a determination of the most likely driver is based at least in part on historical traffic data.

16. The system of claim 1, wherein a determination of the most likely driver comprises an offline process.

17. A method, comprising:

receiving vehicle data comprising data associated with a vehicle over a period of time;

receiving driver location data comprising location data associated with one or more drivers of a roster of drivers;

determining, using a processor, a likely pool of drivers based at least in part on the driver location data and the vehicle data; and processing the vehicle data and the likely pool of drivers using a model to determine a most likely driver associated with an occurrence of an anomalous event on a route, comprising:

determining a subset of face data of the vehicle data based on a set of regulation data associated with the driver location data;

selecting the model based on the subset of face data including all face data, the subset of face data including no face data, or the subset of face data including face data captured in regions where performing facial recognition is allowed, wherein the model comprises executing a machine learning algorithm, a neural network algorithm, an artificial intelligence algorithm, or any combination thereof; and receiving the most likely driver from the model based on the subset of face data and the likely pool of drivers.

18. A computer program product, the computer program product being embodied in a non-transitory computer readable storage medium and comprising computer instructions for:

receiving vehicle data comprising data associated with a vehicle over a period of time;

receiving driver location data comprising location data associated with one or more drivers of a roster of drivers;

determining a likely pool of drivers based at least in part on the driver location data and the vehicle data; and processing the vehicle data and the likely pool of drivers using a model to determine a most likely driver associated with an occurrence of an anomalous event on a route, comprising:

determining a subset of face data of the vehicle data based on a set of regulation data associated with the driver location data;

selecting the model based on the subset of face data including all face data, the subset of face data including no face data, or the subset of face data including face data captured in regions where performing facial recognition is allowed, wherein the model comprises executing a machine learning algorithm, a neural network algorithm, an artificial intelligence algorithm, or any combination thereof; and receiving the most likely driver from the model based on the subset of face data and the likely pool of drivers.

\* \* \* \* \*